(12) United States Patent
Beard et al.

(10) Patent No.: US 12,007,905 B2
(45) Date of Patent: Jun. 11, 2024

(54) TRANSLATION HINTS

(71) Applicant: Arm Limited, Cambridge (GB)

(72) Inventors: Jonathan Curtis Beard, Austin, TX (US); Luis Emilio Pena, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/484,155

(22) Filed: Sep. 24, 2021

(65) Prior Publication Data

US 2023/0102006 A1 Mar. 30, 2023

(51) Int. Cl.
*G06F 12/10* (2016.01)
*G06F 12/1045* (2016.01)
*G06F 12/1072* (2016.01)

(52) U.S. Cl.
CPC ...... *G06F 12/1063* (2013.01); *G06F 12/1072* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 2005/0251629 A1* | 11/2005 | Fahs | | G06F 12/0862 711/E12.075 |
| 2006/0179236 A1* | 8/2006 | Shafi | | G06F 12/1027 711/137 |
| 2010/0146495 A1* | 6/2010 | Song | | G06F 8/456 717/160 |
| 2010/0228945 A1* | 9/2010 | Deshpande | | G06F 12/0815 711/E12.078 |
| 2016/0350225 A1* | 12/2016 | Podaima | | G06F 12/10 |
| 2019/0114262 A1* | 4/2019 | Dimond | | G06F 9/4843 |
| 2019/0129857 A1* | 5/2019 | Shamis | | G06F 3/0685 |
| 2020/0019515 A1* | 1/2020 | Koufaty | | G06F 12/0862 |
| 2020/0371953 A1* | 11/2020 | Guo | | G06F 12/1009 |
| 2021/0149805 A1* | 5/2021 | Pinho | | G06F 12/0862 |

* cited by examiner

*Primary Examiner* — Tracy C Chan
(74) *Attorney, Agent, or Firm* — NIXON & VANDERHYE P.C.

(57) ABSTRACT

A hinter data processing apparatus is provided with processing circuitry that determines that an execution context to be executed on a hintee data processing apparatus will require a virtual-to-physical address translation. Hint circuitry transmits a hint to a hintee data processing apparatus to prefetch a virtual-to-physical address translation in respect of an execution context of the further data processing apparatus. A hintee data processing apparatus is also provided with receiving circuitry that receives a hint from a hinter data processing apparatus to prefetch a virtual-to-physical address translation in respect of an execution context of the further data processing apparatus. Processing circuitry determines whether to follow the hint and, in response to determining that the hint is to be followed, causes the virtual-to-physical address translation to be prefetched for the execution context of the data processing apparatus. In both cases, the hint comprises an identifier of the execution context.

20 Claims, 5 Drawing Sheets

TRANSLATION HINTS

TECHNICAL FIELD

The present disclosure relates to data processing. More particularly, it relates to memory systems.

DESCRIPTION

The start of a new item of work on a data processing apparatus such as a processing core can result in a number of delays as virtual to physical translations are performed in order to fetch data and/or instructions for the new item of work. These delays can be protracted if page table walks are required in order to determine the underlying physical addresses.

SUMMARY

Viewed from a first example configuration, there is provided a data processing apparatus comprising: processing circuitry configured to determine that an execution context to be executed on a hintee data processing apparatus will require a virtual-to-physical address translation; and hint circuitry configured to transmit a hint to a hintee data processing apparatus to prefetch a virtual-to-physical address translation in respect of an execution context of the further data processing apparatus, wherein the hint comprises an identifier of the execution context.

Viewed from a second example configuration, there is provided a data processing method comprising: determining that an execution context to be executed on a hintee data processing apparatus will require a virtual-to-physical address translation; and transmitting a hint to a hintee data processing apparatus to prefetch a virtual-to-physical address translation in respect of an execution context of the further data processing apparatus, wherein the hint comprises an identifier of the execution context.

Viewed from a third example configuration, there is provided a data processing apparatus comprising: receiving circuitry configured to receive a hint from a hinter data processing apparatus to prefetch a virtual-to-physical address translation in respect of an execution context of the further data processing apparatus; and processing circuitry configured to determine whether to follow the hint and, in response to determining that the hint is to be followed, causing the virtual-to-physical address translation to be prefetched for the execution context of the data processing apparatus, wherein the hint comprises an identifier of the execution context.

Viewed from a fourth example configuration, there is provided a data processing method comprising: receiving a hint from a hinter data processing apparatus to prefetch a virtual-to-physical address translation in respect of an execution context of the further data processing apparatus; and determining whether to follow the hint and, in response to determining that the hint is to be followed, causing the virtual-to-physical address translation to be prefetched for the execution context of the data processing apparatus, wherein the hint comprises an identifier of the execution context.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
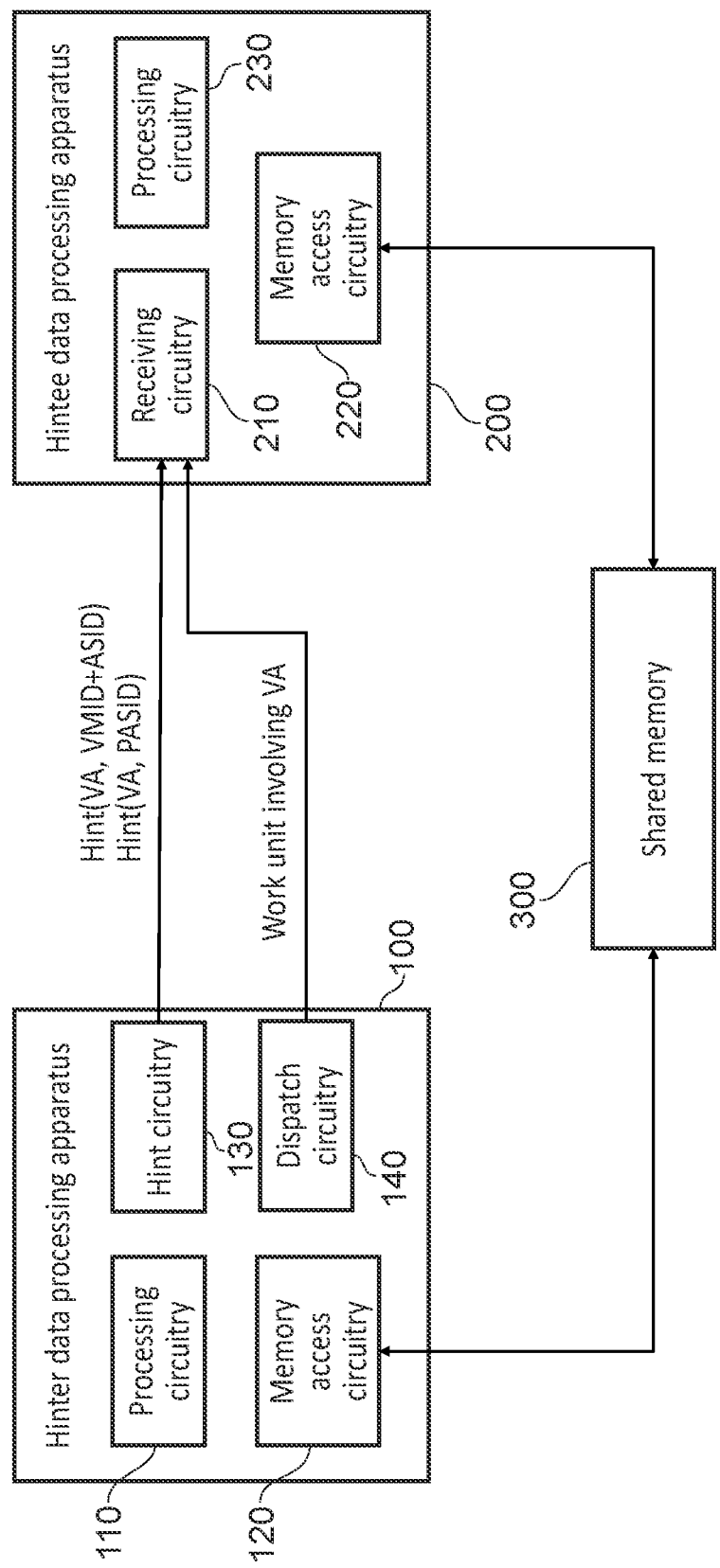
FIG. 1 illustrates a hinter data processing apparatus in accordance with some embodiments and a hintee data processing apparatus in accordance with some embodiments.

Before discussing the embodiments with reference to the accompanying figures, the following description of embodiments is provided.

In accordance with one example configuration there is provided a data processing apparatus comprising: processing circuitry configured to determine that an execution context to be executed on a hintee data processing apparatus will require a virtual-to-physical address translation; and hint circuitry configured to transmit a hint to a hintee data processing apparatus to prefetch a virtual-to-physical address translation in respect of an execution context of the further data processing apparatus, wherein the hint comprises an identifier of the execution context.

By providing a hint to the hintee data processing apparatus that the virtual-to-physical address translation is required, the virtual-to-physical address translation can be prefetched (i.e. before the translation is actually needed). As a consequence of this, the translation will be available (or at least partly acquired) when it is subsequently required and so any latency experienced as a consequence of needing the translation can be limited. In some cases, the latency can be eliminated altogether. In some examples, the hint contains the virtual address for which the virtual-to-physical address translation is required, as well as the identification of the execution context. In some examples, the translation hint could be provided with a PTE to be obtained or the base address of the relevant page that is required for the execution context to be executed.

In some examples, the data processing apparatus comprises: memory access circuitry configured to access a shared memory, which is shared with the hintee data processing apparatus to execute within the execution context, wherein the virtual-to-physical address translation provides a translation from a virtual address to a physical address that is backed by the shared memory. The shared memory is shared between at least the data processing apparatus and the hintee data processing apparatus, although other data processing apparatuses might also have access to this shared memory. As a consequence of having access to the shared memory that is used by the hintee data processing apparatus to execute within the execution context, it is possible for the data processing apparatus to know the virtual addresses that will be required and therefore it is possible for the data processing apparatus to provide a hint that the physical addresses for those virtual addresses (the virtual-to-physical address translations) will be required.

In some examples, the hint is to the hintee data processing apparatus to prefetch the virtual-to-physical address translation into a cache. Such a cache could, for instance, be a Translation Lookaside Buffer (TLB). The process of prefetching involves a request being made to a Memory Management Unit (MMU). The MMU will consult its TLB to determine whether the translation already exists. If so, then the prefetch has already been performed and there is nothing further to do. Otherwise, the MMU attempts to access the address translation from elsewhere in the memory hierarchy. At first this might involve accessing other MMUs in the hierarchy if they exist, each of which may check its own TLBs for the translations. If this fails, then a page walk operation is performed.

In some examples, the hint is to the hintee data processing apparatus to prefetch the virtual-to-physical address translation into a first level cache. A first level cache can be considered to be the first cache of its kind nearest the processor core. For instance, a L1 TLB, a L1 data cache, and an instruction cache may all be considered to be level one caches. Caches that are further down the memory hierarchy (e.g. nearer to memory, that feed data to caches nearer the core) may form other levels of cache up until the Last Level Cache (LLC).

In some examples, the identifier comprises at least one of: an Application Space Identifier, a Virtual Machine identifier, and a Process Address Space Identifier. An Application Space Identifier (ASID) is typically considered to be an identifier of an address space allocated by an operating system or other management software in order to give a dedicated address space to a particular application or user software. In this way, the 'same' virtual address can be used by two different applications (each operating in in a different ASID) and the addresses can point to different physical addresses. A Virtual Machine Identifier (VMID) is a similar concept in which a hypervisor can allocate address spaces to operating systems (which manage applications) such that the 'same' virtual address can be used by two different operating systems and point to different physical addresses. For an application, it might be necessary to provide both a VMID and an ASID in order to translate a virtual address to a physical address. Since the identifiers may use a large number of bits, this can involve a large overhead in order to provide a translation. An alternative is to use a Process Address Space Identifier (PASID), which could be a combination of bothVMID and ASID or could be a completely different identifier that uses a single set of bits to uniquely identify the execution context from among all the other execution contexts in the system (the exact definition depends on the PCIe definition of PASID that is being used). In any event, the identifier is used to help identify a relevant page table entry for the execution context to execute.

In some examples, the data processing apparatus comprises: dispatch circuitry configured to dispatch a work unit to the hintee data processing apparatus to be executed within the execution context; and the virtual-to-physical address translation is used in execution of the work unit by the execution context on the hintee data processing apparatus. The dispatch circuitry is responsible for providing work units (units of work) for other processing devices (such as processor cores) to perform. This can be achieved by requiring the hintee data processing apparatus to execute a function as part of a remote procedure call, for instance. The dispatch circuitry may be able to send work units to a number of different hintee data processing apparatuses (cores) depending on their current and/or estimated workload. The virtual-to-physical address translation is one that is required in order to execute the work unit. That is, the work unit will require a virtual address and therefore a translation to a physical address will be required. By providing the hint, which causes the physical address to be prefetched, the time taken to obtain the physical address when it is required can be reduced and a latency experienced for the work unit can be lessened.

In some examples, the data processing apparatus comprises: memory access circuitry configured to transfer data to a shared memory, which is shared with the hintee data processing apparatus; and notification circuitry configured to issue a notification to the hintee data processing apparatus regarding the data, to cause the hintee data processing apparatus to operate on the data, wherein the virtual-to-physical address translation provides a physical address in the shared memory at which the data is located; and the hint circuitry is configured to transmit the hint before the notification is issued by the notification circuitry. The arrival of the data at the hintee data processing apparatus may not be predictable by the hintee data processing apparatus. In some cases, the data processing apparatus itself might not even be aware of the arrival of the data.

A notification mechanism (for example, a doorbell mechanism) therefore enables a listener at the hintee data processing apparatus to be notified of the data's availability in the shared memory so that the processing of the data in the shared memory can take place. The transmittal of the hint takes place before the notification is issued so that the process of obtaining the translation can be underway before the data starts being processed.

In some examples, the virtual-to-physical address translation provides a physical address at which at least one of data and an instruction is stored. In some cases, the physical address will store an instruction, e.g. that is to be executed within the execution environment whereas in some cases, the physical address will store data, e.g. which is to be processed by the execution environment.

In accordance with one example configuration, there is provided a data processing apparatus comprising: receiving circuitry configured to receive a hint from a hinter data processing apparatus to prefetch a virtual-to-physical address translation in respect of an execution context of the further data processing apparatus; and processing circuitry configured to determine whether to follow the hint and, in response to determining that the hint is to be followed, to cause the virtual-to-physical address translation to be prefetched for the execution context of the data processing apparatus, wherein the hint comprises an identifier of the execution context.

The hint that is received from the hinter data processing apparatus is used to prefetch a virtual-to-physical address translation (before the translation is actually needed). The translation can therefore be made available (or at least partly acquired) when it is subsequently required and so any latency experienced as a consequence of needing the translation can be limited. In some cases, the latency can be eliminated altogether. In some examples, the hint contains the virtual address for which the virtual-to-physical address translation is required, as well as the identification of the execution context.

In some examples, the data processing apparatus comprises: memory access circuitry to access a shared memory, which is shared with the hinter data processing apparatus, wherein the virtual-to-physical address translation provides a translation from a virtual address to a physical address that is backed by the shared memory. The shared memory is shared between at least the data processing apparatus and the hinter data processing apparatus, although other data processing apparatuses might also have access to this shared memory. As a consequence of having access to the shared memory that is used by the hinter data processing apparatus to execute within the execution context, it is possible for the hinter data processing apparatus to know the virtual addresses that will be required and therefore it is possible for the hinter data processing apparatus to provide a hint to the data processing apparatus that the physical addresses for those virtual addresses (the virtual-to-physical address translations) will be required.

In some examples, the hint is to the data processing apparatus to prefetch the virtual-to-physical address translation into a cache. Such a cache could, for instance, be a Translation Lookaside Buffer (TLB). The process of prefetching involves a request being made to a Memory Management Unit (MMU). The MMU will consult its TLB to determine whether the translation already exists. If so, then the prefetch has already been performed and there is nothing further to do. Otherwise, the MMU attempts to access the address translation from elsewhere in the memory hierarchy. At first this might involve accessing other MMUs in the hierarchy if they exist, each of which may check its own TLBs for the translations. If this fails, then a page walk operation is performed.

In some examples, the hint is to the data processing apparatus to prefetch the virtual-to-physical address translation into a first level cache. A first level cache can be considered to be the first cache of its kind nearest the processor core. For instance, a L1 TLB, a L1 data cache, and an instruction cache may all be considered to be level one caches. Caches that are further down the memory hierarchy (e.g. nearer to memory, that feed data to caches nearer the core) may form other levels of cache up until the Last Level Cache (LLC).

In some examples, the identifier comprises at least one of: an Application Space Identifier, a Virtual Machine identifier, and a Process Address Space Identifier. An Application Space Identifier (ASID) is typically considered to be an identifier of an address space allocated by an operating system or other management software in order to give a dedicated address space to a particular application or user software. In this way, the 'same' virtual address can be used by two different applications (each operating in in a different ASID) and the addresses can point to different physical addresses. A Virtual Machine Identifier (VMID) is a similar concept in which a hypervisor can allocate address spaces to operating systems (which manage applications) such that the 'same' virtual address can be used by two different operating systems and point to different physical addresses. For an application, it might be necessary to provide both a VMID and an ASID in order to translate a virtual address to a physical address. Since the identifiers may use a large number of bits, this can involve a large overhead in order to provide a translation. An alternative is to use a Process Address Space Identifier (PASID), which replaces the need for both a VMID and ASID using a single set of bits.

In some examples, the receiving circuitry is configured to receive a work unit from the hinter data processing apparatus to be executed within the execution context; and the virtual-to-physical address translation is used in execution of the work unit by the execution context on the data processing apparatus. The data processing apparatus receives a work unit from a hinter data processing apparatus of some work to be performed. This can be achieved by requiring the data processing apparatus to execute a function as part of a remote procedure call, for instance. The data processing apparatus (e.g. a processing cores) may be one of several such devices to which the hinter data processing apparatus sends work units, depending on their current and/or estimated workload of each data processing apparatus. The virtual-to-physical address translation is one that is required in order to execute the work unit. That is, the work unit will require a virtual address and therefore a translation to a physical address will be required. By providing the hint, which causes the physical address to be prefetched, the time taken to obtain the physical address when it is required can be reduced and a latency experienced for the work unit can be lessened.

In some examples, the data processing apparatus comprises: memory access circuitry configured to access data in a shared memory, which is shared with the hinter data processing apparatus; and notification circuitry configured to receive a notification from the hinter data processing apparatus regarding the data and, in response, to cause the processing circuitry to operate on the data, wherein the virtual-to-physical address translation provides a physical address in the shared memory at which the data is located; and the hint is received before the notification is received by the notification circuitry. The arrival of the data at the data processing apparatus may not be predictable by the data processing apparatus. In some cases, the hinter data processing apparatus itself might not even be aware of the arrival of the data. A notification mechanism (e.g. a doorbell mechanism) therefore enables a listener at the data processing apparatus to be notified of the data's availability in the shared memory so that the processing of the data in the shared memory can take place. The transmittal of the hint takes place before the notification is issued so that the process of obtaining the translation can be underway before the data starts being processed.

In some examples, the virtual-to-physical address translation provides a physical address at which at least one of data and an instruction is stored. In some cases, the physical address will store an instruction, e.g. that is to be executed within the execution environment whereas in some cases, the physical address will store data, e.g. which is to be processed by the execution environment.

In some examples, the processing circuitry is configured to determine that the hint should be disregarded in response to the execution context being inactive or being absent from the data processing apparatus. For an execution context that is inactive, it may not be worth performing the prefetching of the translation since by the time the execution context is activated, the virtual-to-physical address translation may be overwritten by other translations. Fetching such a translation would therefore use capacity of the translation fetching mechanism, and may use processing power in order to perform page walks (if necessary) for little to no benefit. If the execution context is absent from the data processing apparatus (e.g. it relates to an execution context that was not present) then again there is no benefit to the translation being acquired and so it is possible to avoid fetching the translation.

In some examples, the processing circuitry is configured to determine that the hint should be disregarded in response to a currently executing execution context being adversely affected by prefetching the virtual-to-physical address translation. In some situations, fetching the translation could adversely affect another active execution context. For instance, it may result in other entries of a TLB (that are currently being used) being overwritten and therefore having to be refetched. It may therefore be preferable to disregard the hint rather than acquiring the hinted translation.

Particular embodiments will now be described with reference to the figures.

FIG. 1 illustrates a hinter data processing apparatus 100 in accordance with some embodiments and a hintee data processing apparatus 200 in accordance with some embodiments. The hinter data processing apparatus 100, which could take the form of a processor core for instance, determines using its processing circuitry 110 that the hintee data processing apparatus 200 could benefit from the prefetching of a virtual-to-physical address translation. Hint circuitry 130 therefore issues hints to the hintee data processing apparatus 200 (which could take the form of a different processor core for instance) regarding virtual addresses for which the physical address translation may be required. This is achieved by sending a hint containing the virtual address and other parameters required to provide context to the virtual address. FIG. 1 gives two such examples. In the first example, the hint contains the virtual address, a Virtual Machine Identifier (VMID) and an Address Space Identifier (ASID), which in combination identify the address space of an execution context in the form of an application executing on a specific virtual machine on the hintee data processing apparatus 200. The virtual address that is referenced in the hint is one that is located within that virtual address space. A second example considers a hint in which the virtual address is provided together with a Process Address Space Identifier (PASID). The PASID is an alternative to identifying a particular execution context (such as an application or operating system) and does so within a smaller number of bits than both a VMID and an ASID. Other ways of identifying an address space in which the virtual address operates will also be known to the skilled person and can be provided as part of the hint in order to give meaning to the virtual address. The hint is received by receiving circuitry 210 on the hintee data processing apparatus 200, which determines (e.g. on the processing circuitry 230 of the hintee data processing apparatus 200) whether the hint should be used or not.

In this example, the hinter data processing apparatus also operates to dispatch work units to the hintee data processing apparatus 200 (and potentially other such apparatuses) using dispatch circuitry 140. These work units could take the form of remote procedure calls for instance. The work unit makes use of the virtual address that is provided in the hint. For example, the virtual address could be the location of an instruction used within the procedure that is being called or could be the location of data that is used within the procedure. The execution context in which the work unit is performed could be implicit or could be explicitly specified together with the work unit.

A shared memory 300 is provided. The virtual address that is accessed as part of the work unit and that is the subject of the hint is backed by the shared memory 300. That is, the physical address to which the virtual address points is located in the shared memory 300. The hinter data processing apparatus 120 has memory access circuitry 120 and so has a view of this shared memory 300. This enables the processing circuitry 110 to determine that the execution of the work unit would benefit from having the translation of this particular virtual address. The hintee data processing apparatus 200 also has memory access circuitry 220 with which the shared memory 300 and particularly the physical address backed by the virtual address can be accessed.

Although not shown in FIG. 1, it is possible for there to be several hintee data processing apparatuses 200. In this case, the hint circuitry 130 is able to address a hint to a specific hintee data processing apparatus 200.

Figure 2:
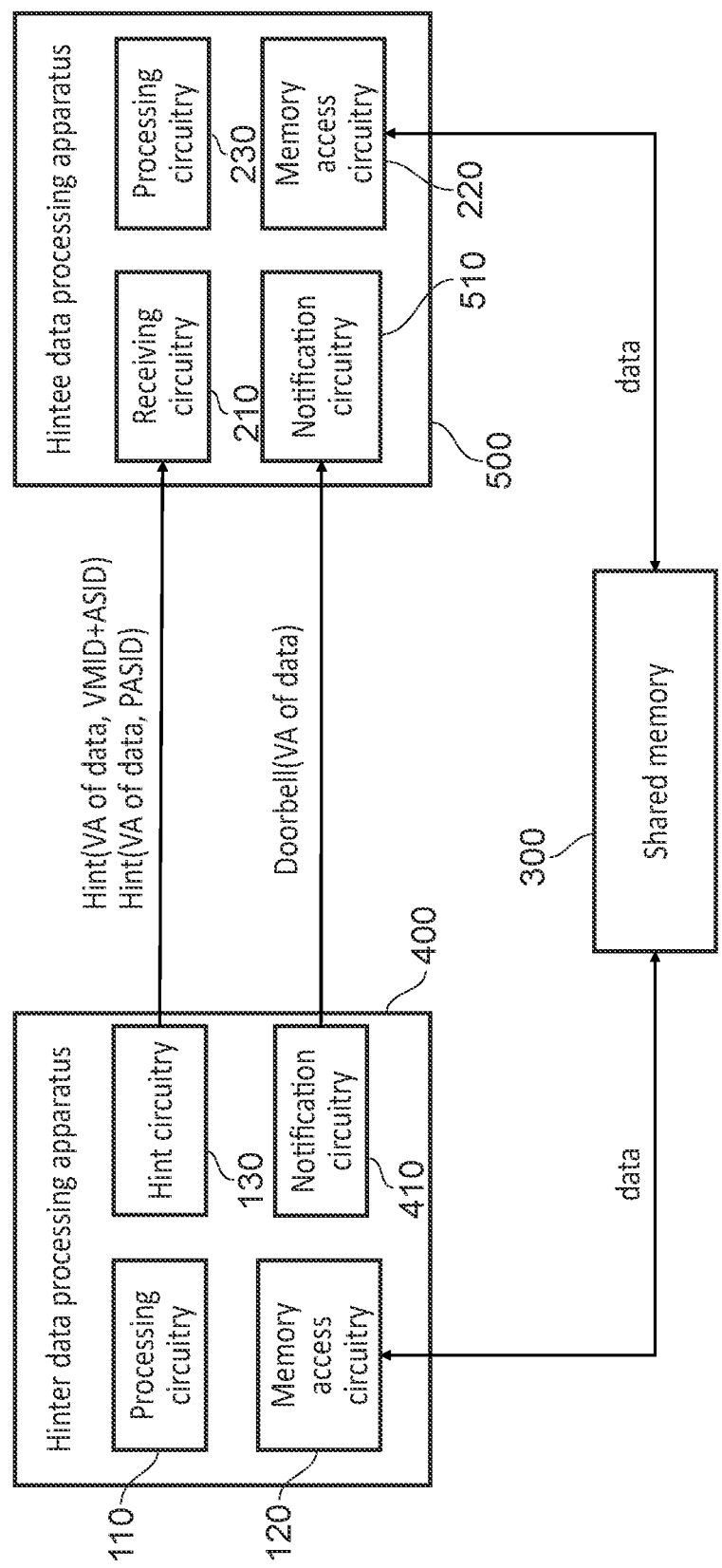
FIG. 2 illustrates another example in which the present techniques may be applied.

FIG. 2 illustrates another example in which the present techniques may be applied. The same reference numerals are used for components of the system that are substantially the same to those already described and for conciseness, their functionality is not re-explained below.

This example considers a system in which the hinter data processing apparatus 400 assists with the asynchronous receipt of data. This could take the form of an interface to a data provider such as a hard disk for instance. When data arrives at the hinter data processing apparatus 400, it is buffered into the shared memory 300 via the memory access circuitry 120 for instance. Before all of the data is buffered into the shared memory 300, the notification circuitry 410 sends a notification in the form of a 'doorbell', which is received by notification circuitry 510 of the hintee data processing apparatus 500. The doorbell serves to alert the hintee data processing apparatus 500 that the data is available and that processing can be begin. The precise point at which the doorbell is issued will depend on the nature of the data. For example, in some instances, it may be possible to immediately operate on the data and so the doorbell is sent immediately. In other situations, all of the data must arrive before processing can begin and so the doorbell is sent after all of the data is received. On receiving the doorbell at the notification circuitry 510, a new thread is spawned (or an inactive thread is woken up from a pool of threads) by the processing circuitry 230 to access the data as it is retrieved by the memory access circuitry 220.

In either event, before the doorbell is issued, a hint is transmitted from the hint circuitry 130 of the hinter 400 to receiving circuitry 210 of the hintee 500. The hint contains an identifier of the execution context that is associated with the data (e.g. a VMID+ASID or PASID) in order to give meaning to the virtual address, together with the virtual address itself. The hint also includes the virtual address of the data that has been buffered into the shared memory 300. By providing the hint before the doorbell, the hintee 500 is able to at least begin obtaining the translation that is used to process the data before the data is accessed.

In both the examples of FIGS. 1 and 2, the term 'execution context' is used to refer to the combination of VMID+ASID or PASID (or other identifier). Note that there is no requirement for this to refer to a process with exclusive access to the data. Indeed, in the case of FIG. 2, the actual thread that processes the data on the hintee data processing apparatus 500 might be unknown ahead of time. However, the data is still associated with a particular execution context in order to provide an address space for the virtual address. In these situations, the thread that handles or processes the incoming data is able to access the address space of the execution context referenced in the hint.

Figure 3:
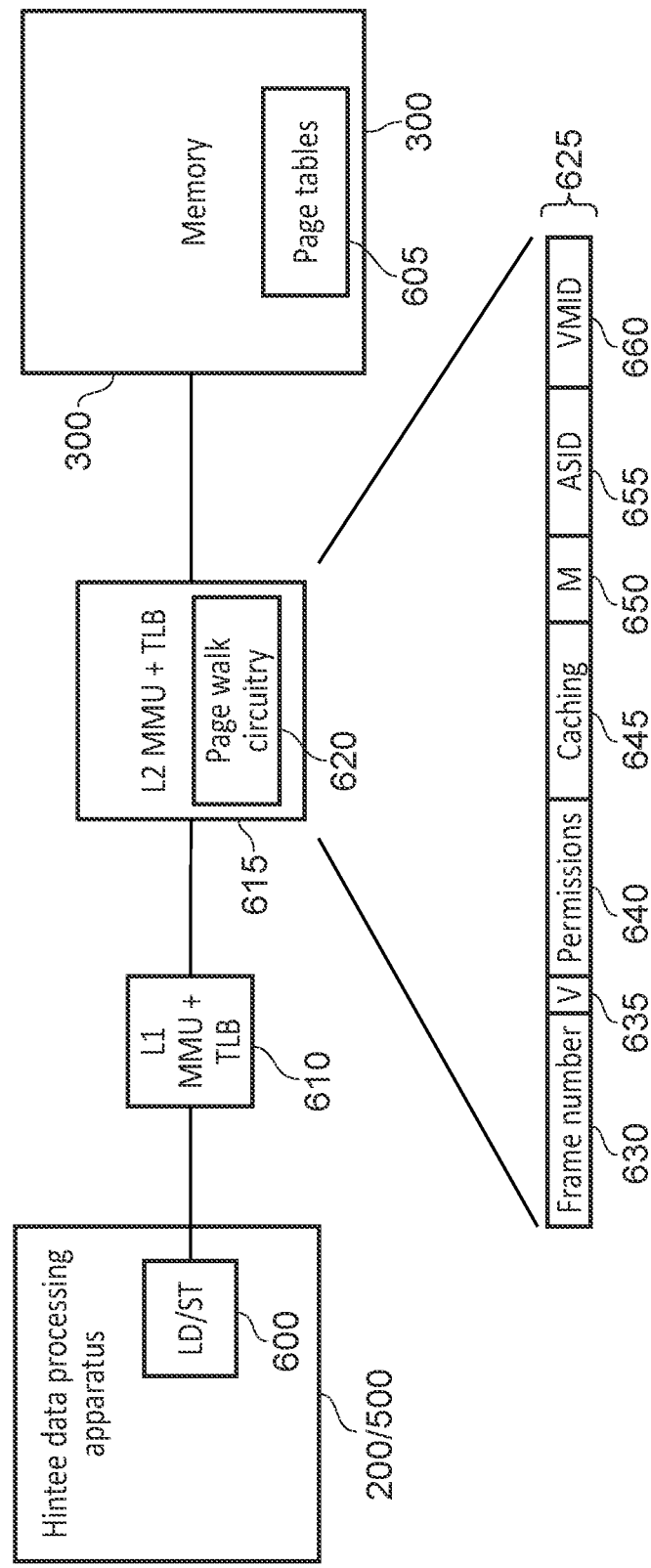
FIG. 3 schematically illustrates components used the process of obtaining a virtual-to-physical address translation in a memory hierarchy.

FIG. 3 schematically illustrates components used the process of obtaining a virtual-to-physical address translation in a memory hierarchy. In these examples, the hintee 200/500 contains a load/store unit 600 that is responsible for accessing the memory hierarchy, which in this example contains a main memory 300 (e.g. a DRAM backed memory). Virtual addresses are used to enable virtual memory and can be used to allow execution contexts to have their own address space—which in turn gives those contexts a view of a (virtual) private memory space. However, they must be translated to physical addresses, which correspond with the actual physical hardware in the memory 300. The actual translation process is well known and not covered in detail here. However, in short, part of the virtual address is translated into a physical frame or page of memory, which covers a block of physical addresses. The remainder of the virtual address is combined with this frame/page identifier in order to point to a specific address in physical memory. The relationships between the virtual addresses and the pages/ frames are stored in page tables 605 in memory. Page walk circuitry 620 can be used to load the page tables into a memory management unit 615 and to walk the entries to search for the relevant frame number for a given virtual address. Having looked up the physical address associated with a virtual address, the data or instruction at that physical address can be accessed.

In practice, the process of page walking is slow and therefore commonly used translations can be cached in Translation Lookaside Buffers (TLBs) for instance. In this way, the process of determining the physical address can be sped up. In this example, a level 1 (L1) TLB and a level 2 (L2) TLB are provided so as to perform a TLB hierarchy. The L1 TLB 610 is smaller and generally faster than the bigger and slower L2 TLB 615. By providing such a hierarchy, it is possible for the most recently accessed translations to be accessed very quickly while enabling less recently accessed translations to still be accessed relatively quickly as compared to the speed of performing a page walk.

In the present technique, when a hint is received, the hintee data processing apparatus 200/500 may prefetch the translation for the virtual address mentioned in the hint. The translation is prefetched in the sense that it is acquired before the translation is actually needed for operating on the data—e.g. before the work unit is sent (in the example of FIG. 1) and before the doorbell is issued (in the example of FIG. 2).

FIG. 3 also illustrates an example of a page table entry 625, which is one of the entries of the page tables 605 loaded into the memory management unit (MMU) 615, which is responsible for virtual-to-physical address translation. The page table entry 625 includes a frame number 630, which is a frame associated with a physical address, a validity flag (V) 635, a set of permissions 640, caching configuration/attributes 645, a modified/dirty flag 650, an ASID 655 and a VMID 660. The ASID 655 and VMID 660 provide a virtual address space or execution context with which the virtual address is associated. That is to say that the same virtual address might point to different physical addresses (or frame numbers) for different combinations of ASID+VMID (or PASID). Hence, for a hint to be usable, it is necessary to not only identify the virtual address for which the translation is needed but also the address space (e.g. execution context) to which the virtual address relates.

Figure 4:
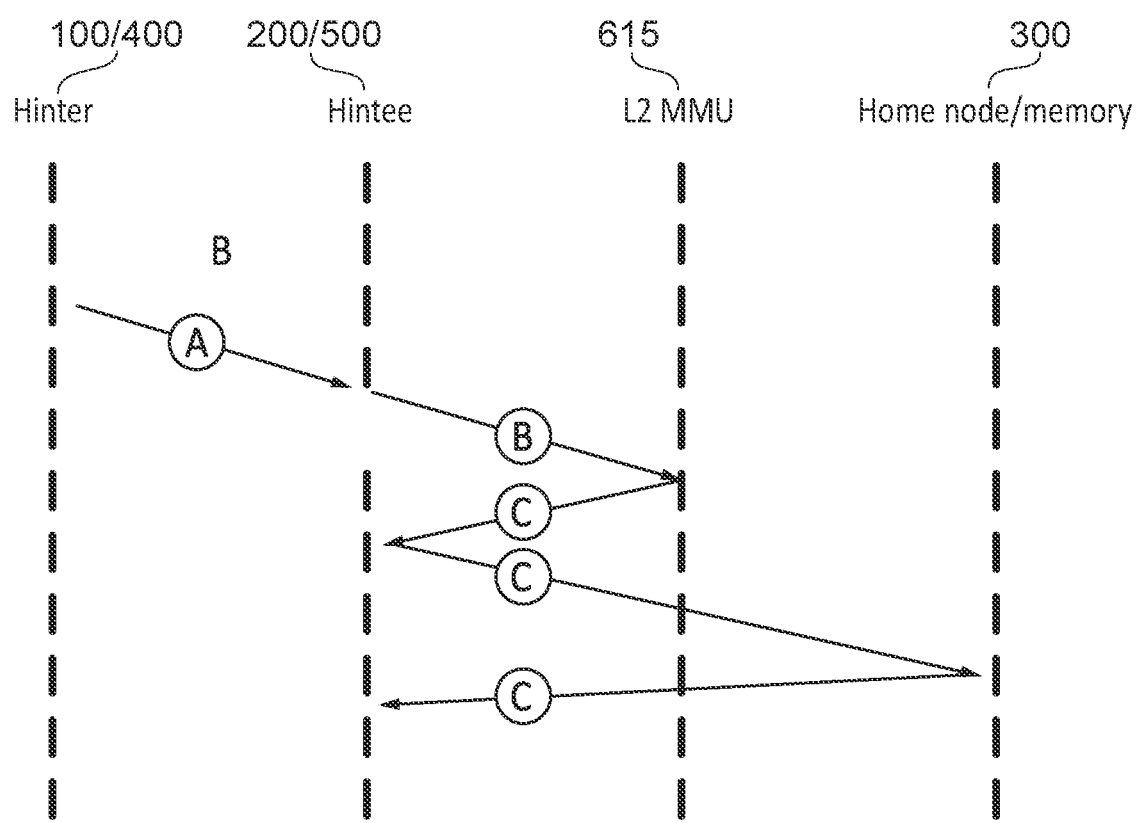
FIG. 4 illustrates a communication sequence that occurs in the provision of a hint in accordance with some examples.

FIG. 4 illustrates a communication sequence that occurs in the provision of a hint. At a step A, the hinter 100/400 issues a HintStashTranslationByVA message to the target core (hintee 200/500). The HintStashTranslationByVA includes both a virtual address and an identifier of an address space of the virtual address (e.g. an execution context). At a step B, the hintee 200/500 determines whether to follow the hint or not. If the hintee 200/500 decides to follow the hint then at step C, the L2 MMU 615 is queries to see if the translation already exists. If not, a request to fetch the translation is made to the L2 MMU 615. In practice, the request can be sent to any or all MMUs within the memory system. However, it may take longer to obtain the translation into an L1 MMU 610 are tighter than for a L2 MMU 620 and so although this might be more desirable in certain circumstances, it more difficult to obtain the translation in time for the translation being required.

In this case, the request is sent to the L2 MMU 615. In this example, the L2 MMU 615 accesses the main memory 300 (e.g. via a home node) to obtain the page tables and thereby perform a page walk in order to perform the translation. In this example, if the request was sent to the L1 MMU 610, then the LU MMU 610 might firstly try to obtain the translation from the L2 MMU 620 in order to avoid performing a page walk (assuming that the translation was not already present in the L1 MMU 610).

Figure 5:
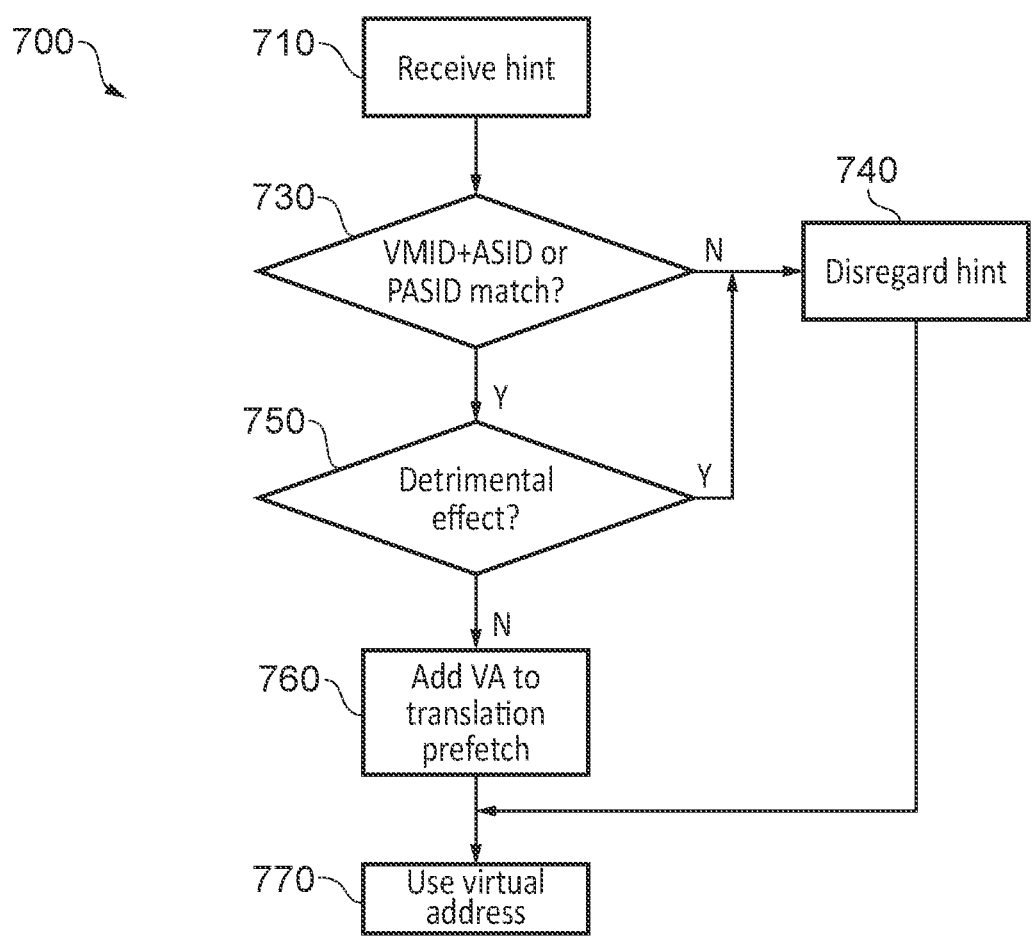
FIG. 5 provides a flowchart that shows an example method of responding to a hint received from a hinter data processing apparatus.

FIG. 5 provides a flowchart 700 that shows an example method of responding to a hint received from a hinter data processing apparatus 100/400. At a step 710, the hint is received. At a step 730, the hintee data processing apparatus 200/500 determines whether the execution context applies to the hintee data processing apparatus 200/500. For instance, the hint might refer to an execution context/address space that is not active or is not at all present on the hintee data processing apparatus 200/500. An active VMID+ASID or active PASID register may be accessed in order to determine those address spaces that are currently active. If the VMID+ASID/PASID/other context is not active then at step 740, the hint is disregarded. Otherwise, at step 750, the apparatus makes a determination as to whether prefetching the translation will have a detrimental effect on, e.g. the currently executing execution context. For instance, if the currently executing execution context is actively obtaining its own translations then acquiring a translation for an execution context that is active but not currently executing might have a detrimental effect by displacing a translation that is currently being used for a translation that might, itself, be displaced before it can be used. In this case, again, the process proceeds to step 740 where the hint is disregarded. If no detrimental effect is likely to occur then at step 760, the translation is added to a prefetch list. This could involve simply fetching the translation immediately, or could use a more complex prefetching process in which spare bandwidth is used to acquire translations from a list. Having performed the prefetch at step 760, the virtual address is used at a step 770. This could be as a consequence of executing a work unit or could be from processing incoming buffered data for instance.

Through the above techniques, it is possible to issue and respond to a hint that is received in respect of a virtual-to-physical address translation. The relevant physical address can then be acquired meaning that when the virtual address is later encountered, any latency experienced as a consequence of acquiring the translation (e.g. through a page walk) can be reduced or even eliminated.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A hinter data processing apparatus comprising:
processing circuitry configured to perform a determination of whether an executable execution context to be executed on a hintee data processing apparatus will require a virtual-to-physical address translation, wherein the hinter data processing apparatus is a processor core and the hintee data processing apparatus is a separate processor core separate from the hinter processing apparatus, wherein the determination is made prior to the executable execution context being executed on the hintee data processing apparatus; and
hint circuitry configured to transmit a hint to the hintee data processing apparatus to prefetch a virtual-to-physical address translation with respect to the executable execution context on a condition that prefetching the virtual-to-physical address translation will not displace another translation being used by a current execution context, prior to the executable execution context being executed on the hintee data processing apparatus,
wherein the hint comprises an identifier of the executable execution context.

2. The hinter data processing apparatus according to claim 1, comprising:
memory access circuitry configured to access a shared memory, which is shared with the hintee data processing apparatus to execute within the executable execution context, wherein
the virtual-to-physical address translation provides a translation from a virtual address to a physical address that is backed by the shared memory.

3. The hinter data processing apparatus according to claim 1, wherein
the hint is to the hintee data processing apparatus to prefetch the virtual-to-physical address translation into a cache.

4. The hinter data processing apparatus according to claim 1, wherein
the hint is to the hintee data processing apparatus to prefetch the virtual-to-physical address translation into a first level cache.

5. The hinter data processing apparatus according to claim 1, wherein
the identifier comprises at least one of: an Application Space Identifier, a Virtual Machine identifier, and a Process Address Space Identifier.

6. The hinter data processing apparatus according to claim 1, comprising:
dispatch circuitry configured to dispatch a work unit to the hintee data processing apparatus to be executed within the executable execution context; and
the virtual-to-physical address translation is used in execution of the work unit by the executable execution context on the hintee data processing apparatus.

7. The hinter data processing apparatus according to claim 1, comprising:
memory access circuitry configured to transfer data to a shared memory, which is shared with the hintee data processing apparatus; and
notification circuitry configured to issue a notification to the hintee data processing apparatus regarding the data, to cause the hintee data processing apparatus to operate on the data, wherein
the virtual-to-physical address translation provides a physical address in the shared memory at which the data is located; and
the hint circuitry is configured to transmit the hint before the notification is issued by the notification circuitry.

8. The hinter data processing apparatus according to claim 1, wherein
the virtual-to-physical address translation provides a physical address at which at least one of data and an instruction is stored.

9. A data processing method comprising:
performing a determination at a processor core that an executable execution context to be executed on a hintee data processing apparatus, wherein the hintee data processing apparatus is a separate processor core separate from the processor core, will require a virtual-to-physical address translation, wherein the determination is made prior to the executable execution context being executed on the hintee data processing apparatus; and
transmitting a hint to the hintee data processing apparatus to prefetch a virtual-to-physical address translation with respect to an executable execution context of the further data processing apparatus on a condition that prefetching the virtual-to-physical address translation will not displace another translation being used by a current execution context, prior to the executable execution context being executed on the hintee data processing apparatus,
wherein the hint comprises an identifier of the executable execution context.

10. A hintee data processing apparatus comprising:
receiving circuitry configured to receive a hint from a hinter data processing apparatus to prefetch a virtual-to-physical address translation with respect to an executable execution context, prior to the executable execution context being executed on the hintee data processing apparatus, wherein the hintee data processing apparatus is a processor core and the hinter data processing apparatus is a separate processor core separate from the hintee processing apparatus; and
processing circuitry configured to determine whether following the hint will displace another translation being used by a current execution context and, in response to determining that following the hint will not displace the another translation being used by the current execution context, causing the virtual-to-physical address translation to be prefetched for the executable execution context prior to the executable execution context being executed on the hintee data processing apparatus,
wherein the hint comprises an identifier of the executable execution context.

11. The hintee data processing apparatus according to claim 10, comprising:
memory access circuitry to access a shared memory, which is shared with the hinter data processing apparatus, wherein
the virtual-to-physical address translation provides a translation from a virtual address to a physical address that is backed by the shared memory.

12. The hintee data processing apparatus according to claim 10, wherein
the hint is to the hintee data processing apparatus to prefetch the virtual-to-physical address translation into a cache.

13. The hintee data processing apparatus according to claim 10, wherein
the hint is to the hintee data processing apparatus to prefetch the virtual-to-physical address translation into a first level cache.

14. The hintee data processing apparatus according to claim 10, wherein
the identifier comprises at least one of: an Application Space Identifier, a Virtual Machine identifier, and a Process Address Space Identifier.

15. The hintee data processing apparatus according to claim 10, wherein
the receiving circuitry is configured to receive a work unit from the hinter data processing apparatus to be executed within the executable execution context; and
the virtual-to-physical address translation is used in execution of the work unit by the executable execution context on the hintee data processing apparatus.

16. The hintee data processing apparatus according to claim 10, comprising:
memory access circuitry configured to access data in a shared memory, which is shared with the hinter data processing apparatus; and
notification circuitry configured to receive a notification from the hinter data processing apparatus regarding the data and, in response, to cause the processing circuitry to operate on the data, wherein
the virtual-to-physical address translation provides a physical address in the shared memory at which the data is located; and
the hint is received before the notification is received by the notification circuitry.

17. The hintee data processing apparatus according to claim 10, wherein
the virtual-to-physical address translation provides a physical address at which at least one of data and an instruction is stored.

18. The hintee data processing apparatus according to claim 10, wherein
the processing circuitry is configured to determine that the hint should be disregarded in response to the executable execution context being inactive or being absent from the hintee data processing apparatus.

19. The hintee data processing apparatus according to claim 10, wherein
the processing circuitry is configured to determine that the hint should be disregarded in response to determining that prefetching the virtual-to-physical address translation will displace another translation being used by a current execution context.

20. A data processing method comprising:
receiving a hint at a processor core from a hinter data processing apparatus, wherein the hinter data processing apparatus is a separate processor core separate from the processor core, to prefetch a virtual-to-physical address translation with respect to an executable execution context, prior to the executable execution context being executed on a data processing apparatus; and
determining whether following the hint will displace another translation being used by a current execution context and, in response to determining that following the hint will displace the another translation being used by the current execution context, causing the virtual-to-physical address translation to be prefetched for the executable execution context prior to the executable execution context being executed on the hintee data processing apparatus,
wherein the hint comprises an identifier of the executable execution context.

* * * * *